United States Patent [19]

Nomura et al.

[11] 4,052,749

[45] Oct. 4, 1977

[54] THIN FILM MAGNETIC HEAD

[75] Inventors: Noboru Nomura, Kyoto; Kenji Kanai, Neyagawa; Nobuyuki Kaminaka, Moriguchi; Norimoto Nouchi, Katano, all of Japan

[73] Assignee: Matsushita Electric Industrial Co., Ltd., Osaka, Japan

[21] Appl. No.: 688,076

[22] Filed: May 19, 1976

[51] Int. Cl.² ............................ G11B 5/20; G11B 5/14; G11B 5/16
[52] U.S. Cl. .................................... 360/123; 360/126; 360/127
[58] Field of Search .................. 360/123, 126, 127

[56] References Cited

U.S. PATENT DOCUMENTS

| 3,291,918 | 12/1966 | Kuhrt | 360/112 |
|---|---|---|---|
| 3,639,699 | 2/1972 | Tiemann | 360/126 |
| 3,643,035 | 2/1972 | Tsukagoshi | 360/112 |
| 3,908,194 | 9/1975 | Romankiw | 360/113 |

Primary Examiner—Robert S. Tupper
Attorney, Agent, or Firm—Wenderoth, Lind & Ponack

[57] ABSTRACT

A thin film magnetic head includes a magnetic core formed by first and second magnetic layers with at least one winding of conductor layer provided therebetween. Separating layers are provided to electrically isolate the conductor layer from its neighboring layers. The separating layers are semiconductor layers.

12 Claims, 9 Drawing Figures

THIN FILM MAGNETIC HEAD

FIELD OF THE INVENTION

The present invention relates to a thin film magnetic head.

DESCRIPTION OF THE PRIOR ART

Of late, a technique of composing a magnetic head on the basis of thin film formation, and of closely packing the head batch into one substrate has been developed in order to increase the density of magnetic recording.

Such a thin film magnetic head is illustrated in FIG. 1. 1 represents the substrate, on which the lower core 2 formed of a thin film of such ferromagnetic material as permalloy, etc., is placed. The first insulator layer 3 is formed, covering the lower core 2 and the substrate 1; and on the first layer 3, a winding 4 formed of a conductor layer is provided. Then, the second insulator layer 5 is provided, covering the winding 4 and the first insulator layer 3, and on the second layer, the upper 6 is provided. The lower core 2 and the upper core 6 being abutted at the rear 7, but set apart and forming a gap at the front, form a magnetic circuit. A large number of such unit heads composed as above described being aligned on a common substrate are put to use as a head assembly.

Such a thin film magnetic head batch is required to be made as small as possible to attain close packing. For this reason, the winding 4 is provided in a simplified single turn. As a consequence, in order to obtain a strong magnetic field to be imposed on the magnetic tape at the time of recording, a large current should flow on the winding 4. Much evolution of heat from the winding 4 results.

The winding 4 is held between the first and the second insulator layers 3 and 5 for the prevention of leakage of current, and the insulators have small thermal conductivities. It is for this reason difficult to transmit the heat from the winding to the outside, and the dissipation of heat is not proper.

Accordingly, when recording over a long period of time, the temperature of the winding 4 goes up, causing disconnection or oxidation of wire and leakage of current through the cracks that have occurred in the insulating layers 3 and 5 due to the thermal expansion of the winding 4.

BRIEF SUMMARY OF THE INVENTION

The first object of this invention is to provide a thin film magnetic head in which the heat that has evolved from the windings is effectively dissipated.

The second object of this invention is to provide a thin film magnetic head in which the heat of the windings is substantially dissipated without losing the effect of preventing the leakage of current from the windings.

According to this invention intended to attain these objectives, as the separating layers for preventing leakage of current by electrically isolating the windings from the cores and the other parts, layers mainly formed of semiconductors are provided in place of the conventional insulators. In that way, separating layers having a practically trouble-free insulating property and a substantial heat dissipating effect are formed.

BRIEF DESCRIPTION OF THE DRAWINGS

Other objects and features of this invention will become more apparent from the following description referring to the drawings in which.

DETAILED DESCRIPTION OF THE PREFERRED EMBODIMENTS

Figure 1:
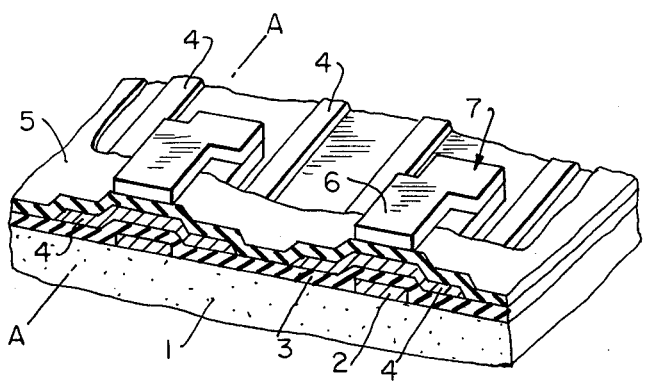
FIGS. 1 and 2 illustrate the conventional thin film magnetic head, FIG. 1 being a sectioned perspective view, and FIG. 2 being a sectional view.
Figure 2:
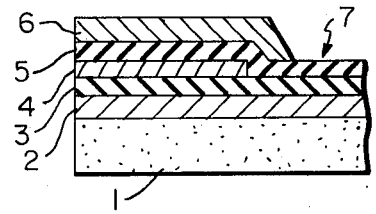
Figure 3:
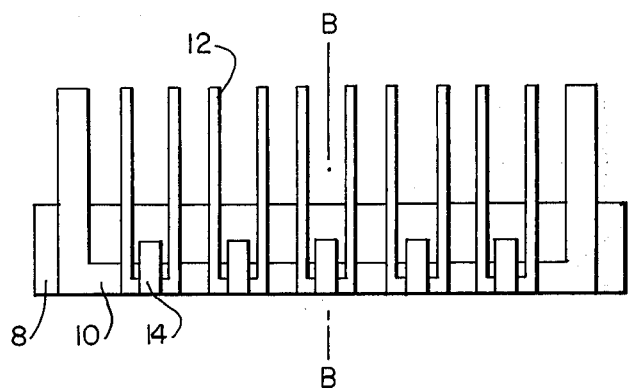
FIG. 3 is a plan view of the thin film magnetic head embodying this invention.
Figure 4:
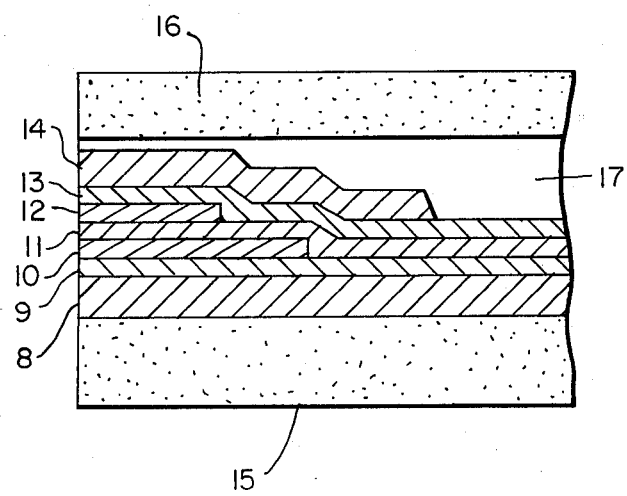
FIG. 4 is a sectional view of the head of FIG. 3.

FIG. 3 presents an embodiment in which the idea of this invention is applied to the thin film magnetic head batch composed by using windings for signal and for bias. Referring to FIG. 3, 8 denotes the lower core formed of such ferromagnetic material as permalloy, etc., in the shape of a thin film. Above the lower core 8, a large number of upper cores 14 are formed, so that the magnetic circuit of each unit head is composed between each upper core 14 and lower core 8. Between the upper core 14 and the lower core 8, a single bias winding 10 formed of a conductor layer is provided common to every unit head. 12 is the signal winding provided in each unit head. In addition to the above mentioned structure, the separating layers 9, 11 and 13 which isolate the windings 10 and 12 respectively from other parts as shown in FIG. 4, but not shown in FIG. 3, are provided. These separating layers are formed of a semiconductor such as Si, NiO, etc., which may be deposited by way of vapor deposition, electrodeposition, vapor growth, etc. These elements are arranged on the substrate 15 such as glass, etc. On the top of the upper core 14, the protective plate 16 is put through an adhesive 17.

In the above described structure, the current flowing in the signal winding 12 is reduced by providing the bias winding 10 common to every unit head, thereby cutting down the evolution of heat. In this instance, however, the separating layer between the bias winding 10 and the signal winding 12 receives the heat from both windings 10 and 12, and for this reason, effective dissipation of heat is ncessary for preventing the temperature rise.

This necessity is met by forming the separating layers 9, 11 and 13 as semiconductors. That is to say, the thermal conductivity of the semiconductors is substantially larger than that of the insulators hitherto used as the separating layers. For example, $SiO_2$, the principal insulator which has been formerly employed, has 0.014~0.14 (W/cm. deg). In contrast, Si used in an embodiment of this invention, has 1.5 (W/cm. deg), which is about 10~100 times the former. On this basis, effective transmission of the heat evolving from the windings 10 and 12 and subsequent dissipation to the outside is made possible.

When the separating layers are formed as semiconductors, the electrical insulation between the signal winding 12, bias winding 10 and lower and upper cores 8 and 14 diminishes. This, however, may be practically neglected as explained hereunder.

The conductors used for the windings 10 and 12 include Al, Cu, Au, etc., which have resistivity of $1.6 \times 10^{-6} \sim 2.6 \times 10^{-6} (\Omega cm)$. On the other hand, the resistivity of semiconductors are generally $10^{-3} \sim 10^{12}$ ($\Omega$cm), especially those of Si, NiO, etc., being $10^4 \sim 2.3 \times 10^5$ ($\Omega$cm), which are about $10^{10}$ times as large as those of conductors above mentioned.

The electrical resistance R in a body may be related to the sectional area S perpendicular to the direction of the current, its length l in the direction of the current and to the resistivity $\rho$ of the material of the body, by the formula, $R = \rho \cdot l/S$. If $l_1 = 2$mm, $S_1 = 20\mu m^2$ and $\rho_1 = 2.6 \times 10^{-6} \Omega$cm, as applied to a winding, then $R_1 = 1.7\Omega$. On the other hand, for the resistance between windings in a semiconductor layer, $l_2 = 1\mu m$, $S_2 = 1000\mu m^2$ and $\rho_2 = 10^4 \Omega$cm may be chosen as an example, In this instance, $R = 100$ K$\Omega$. With such a combination, the low resistance of the semiconductor poses no practical problem, since the currents flowing in the separating layers formed of the semiconductors are negligibly small, as compared with that flowing in the wingings of conductors.

Usuable as semiconductors $S_1$ are graphite, Ge, InSb, NiO, AlP, GaP, AlSb, GaAs, GaSb, InAs, etc., which have higher thermal conductivities than that of insulator $SiO_2$.

In the above described embodiment, all of the separating layers 9, 11 and 13 are composed of semiconductors, however an effective improvement in the heat radiating property will be achieved by using a single semiconductor layer for any one of these layers.

However, among semiconductors, there are some which have resistance coefficients smaller than $10^{-2}\Omega$cm. With such materials, the insulation between the bias wire and signal wire and between cores, etc., is insufficient. In either this or any other case, the insulating property may be improved by replacing part of the semiconductor layer with an insulator layer, as hereinafter described.

In FIGS. 5-9, the same numerals are used to identify the same elements to spare the explanation.

Figure 5:
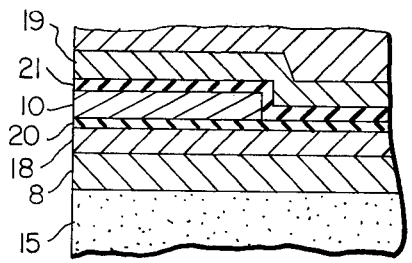
FIGS. 5 - 9 are sectional views of other thin film magnetic heads embodying this invention.

In the embodiment of FIG. 5, as the layers for electrically isolating the winding 10, in addition to the semiconductor layers 18 and 19, thin insulator layers 20 and 21 are provided between the winding 10 and semiconductor layers 18 and 19. These insulator layers 20 and 21 have a thickness, for example, of less than 1000 A, which is very thin as compared with those of the semiconductor layers 18 and 19. Such layers may be deposited by way of vapor deposition or spattering, etc. In this diagram, the signal winding and the upper core are not shown.

With this structure, the insulator layers 20 and 21, being very thin, have only a effect on the heat transmission, permitting proper heat radiation through the semiconductor layers 18 and 19. Moreover, the electrical isolation of the winding 10 is ensured by the cooperation of the insulator layers 20 and 21 and the semiconductor layers 18 and 19. Thus, sound insulator layers 20 and 21 provide adequate insulation, and any defective insulation due to presence of pinholes, etc., may be compensated by the resistances of the semiconductor layers 18 and 19 in providing practically effective insulation.

For some applications, use of only one of these insulator layers 20 and 21 may be effective.

Figure 6:
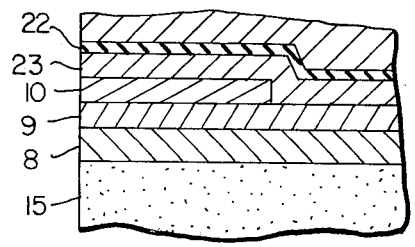

Or, as shown in FIG. 6, the effect of electrical isolation may be improved by placing the insulator layer 22 in contact with the semiconductor layer 23 on the side opposite to the winding 10.

While in the preceeding embodiments, the insulator layers are provided as layers independent from the windings or the semiconductor layers, in the following, windings or semiconductor layers with their surfaces turned into insulators by oxidation, etc., are described by way of example.

Figure 7:
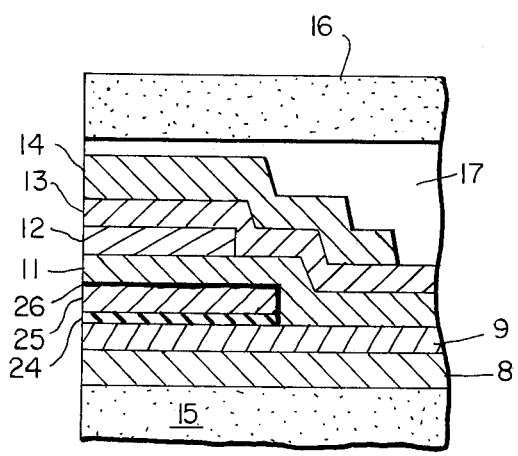

Referring to FIG. 7, 24 denotes an insulating film deposited on the top of the separating layer 9, and on this insulating film 24, the conductor layer 25 composing the winding is stuck. On the surface of this conductor layer 25, the oxide layer 26 is formed as the insulating layer. In providing the aforementioned insulating film 24, such a conductor as Al or Cu is deposited by way of vapor deposition, etc., formed in the shape of the winding by etching, and then, turned into the oxide film by way of anode oxidation, etc. The thickness of this film 24 is less than 1000 A. The conductor layer 25 is formed by depositing Al or Cu, etc., on the insulating film 24 by way of vapor deposition, etc., and the oxide layer 26 is formed by oxidizing several 100 A of its surface by way of anode oxidation, etc. Accordingly, the conductor layer 25 is covered with insulators on both top and bottom surfaces thereof. This embodiment shows excellent characteristics of both heat radiation and electrical isolation. The oxide layer 26 is formed easier by oxidizing the conductor layer 25 than by vapor deposition.

The resistance between the bias winding and the signal winding through the aforementioned oxide layer 26 is determined, for example, as $R \div 30$ M$\Omega$, with $l_3 = 0.02\mu m$ (thickness of oxide layer), $S_3 = 6 \times 10^4 \mu m^2$ (surface area of the winding) and $\rho_3 = 10^{13} \Omega$cm, suggesting that adequate insulation effect is obtainable.

Figure 8:
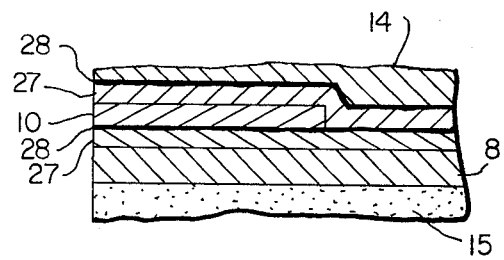

FIG. 8 presents an embodiment in which the insulator layer 28 is formed by subjecting the surface of the semiconductor layer 27 to such a treatment as oxidation or nitrification. For example, when Si is used as the semiconductor layer 27, the Si layer deposited is oxidized, thereby forming the insulator layer 28 of $SiO_2$.

Figure 9:
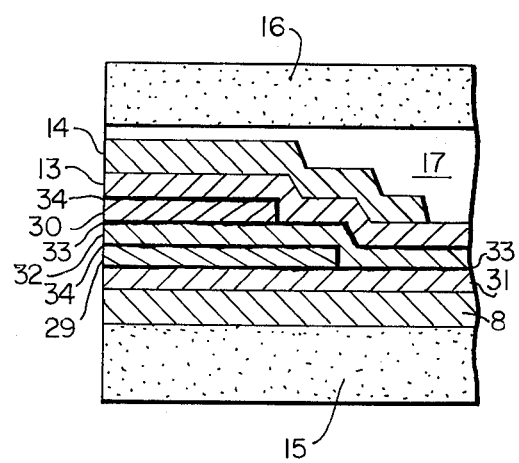

As a combination of the techniques represented by FIG. 7 and FIG. 8, first insulator layers 33 processed from the semiconductor layers are disposed on the bottom surfaces of the windings 29 and 30, and second insulator layers 34 processed from the conductor layers composing the windings 29 and 30 are disposed on the top surfaces of the windings 29 and 30, as shown in FIG. 9. Such a structure with the windings 29 and 30 being directly coated with the insulator layers 33 and 34 provides high isolation effect, and moreover, the method of forming the insulator layers 33 and 34 is very simple.

As the temperature rises, the Al or Cu, etc., being the conductor forming the winding, is diffused into the semiconductor or the insulator, especially at the part where it is in contact with the winding. Thus, the winding is eroded during the course of operation until it is thin, resulting in its inability to pass sufficient current after a long period of operation.

To resolve this disadvantage, it is suggested that a film capable of preventing the diffusion abovementioned be interposed between the winding and its surrouding. For example, since $Si_3N_4$ (silicon nitride) has a thermal diffusion coefficient to Al which is ¼ - ⅓ of that of $SiO_2$, the diffusion from the Al winding may be restrained by covering the winding with $Si_3N_4$. Furthermore, $Si_3N_4$, having a resistivity of $10^{-13}\Omega$cm, serves effectively as an insulator, and for this reason, this compound may be employed as the insulator layer in an embodiment such as FIG. 5.

In the embodiments hereabove described, a plural number of insulator layers are provided, but even a single layer will attain reasonable insulation effect, based on the same principle of the technique. Case by case option may be taken between these approaches.

Furthermore, by using suitable combinations of various insulator layers, insulator layer structures that meet the respective requirements may be produced.

What is claimed is:

1. A thin film magnetic head comprising:
   first and second magnetic layers forming magnetic cores, said first and secod magnetic layers being magnetically connected at first ends thereof and forming a gap between second ends thereof;
   at least one conductor layer positioned between said first and second magnetic layers, said conductor layer comprising winding means through which current flows during use of the magnetic head;
   said at least one conductor layer having on each of two opposite sides thereof a separating layer means for separating and electrically isolating said conductor layer from adjacent layers; and
   said separating layer means on at least one side of said at least one conductor layer including a semiconductor layer.

2. A thin film magnetic head as claimed in claim 1, wherein said separating layer means including a semiconductor layer further includes an insulator layer.

3. A thin film magnetic head as claimed in claim 2, wherein said semiconductor layer is positioned between said insulator layer and said conductor layer.

4. A thin film magnetic head as claimed in claim 2, wherein said insulator layer is positioned between said semicoducor layer and said conductor layer, and said insulator layer has a thickness such as to allow heat generated in said conductor layer during use of the magnetic head to be dissipated through said insulator layer to said semiconductor layer.

5. A thin film magnetic head as claimed in claim 2, wherein said insulator layer comprises an oxidized surface region of said semiconductor layer.

6. A thin film magnetic head as claimed in claim 2, wherein said insulator comprises a nitrified surface region of said semiconductor layer.

7. A thin film magnetic head as claimed in claim 2, wherein said insulator layer comprises an oxidized surface region of said conductor layer on the surface thereof facing said semiconductor layer.

8. A thin film magnetic head as claimed in claim 2, wherein said semiconductor layer comprises a Si layer, and said insulator layer comprises a $Si_3N_4$ layer provided between said Si layer and said conductor layer.

9. A thin film magnetic head as claimed in claim 1, wherein said separating layer means on both sides of said conductor layer each comprises a semiconductor layer and an insulating layer.

10. A thin film magnetic head as claimed in claim 9, wherein a first said insulator layer comprises an oxidized surface region of said conductor layer on a first surface thereof facing a first said semiconductor layer.

11. A thin film magnetic head as claimed in claim 10, wherein a second said insulator layer comprises an oxidized surface region on the surface of a second said semiconductor layer facing a second surface of said conductor layer.

12. A thin film magnetic head as claimed in claim 10, wherein a second said insulator layer comprises a nitrified surface region on the surface of a second semiconductor layer facing a second surface of said conductor layer.

* * * * *